US012363051B2

(12) United States Patent
Dearth et al.

(10) Patent No.: US 12,363,051 B2
(45) Date of Patent: Jul. 15, 2025

(54) CROSSBAR MULTIPATHING FOR MULTICAST PERFORMANCE IN TILED SWITCHES

(71) Applicant: NVIDIA Corporation, Santa Clara, CA (US)

(72) Inventors: Glenn Alan Dearth, Groton, MA (US); Nan Jiang, Sudbury, MA (US); Mark D. Hummel, Franklin, MA (US); Gregory Michael Thorson, Eau Claire, WI (US); Karan Gupta, Noida (IN); Dane Thomas Mrazek, Redwood City, CA (US); Eric Anderson, Palo Alto, CA (US); Larry Robert Dennison, Mendon, MA (US)

(73) Assignee: NVIDIA Corporation, Santa Clara, CA (US)

( * ) Notice: Subject to any disclaimer, the term of this patent is extended or adjusted under 35 U.S.C. 154(b) by 411 days.

(21) Appl. No.: 17/848,088

(22) Filed: Jun. 23, 2022

(65) Prior Publication Data

US 2022/0417176 A1 Dec. 29, 2022

Related U.S. Application Data

(60) Provisional application No. 63/213,901, filed on Jun. 23, 2021.

(51) Int. Cl.
| | | |
|---|---|---|
| H04L 49/101 | (2022.01) | |
| H04L 45/00 | (2022.01) | |
| H04L 45/24 | (2022.01) | |
| H04L 45/30 | (2022.01) | |
| H04L 45/80 | (2022.01) | |
| H04L 49/201 | (2022.01) | |

(52) U.S. Cl.
CPC ............ *H04L 49/101* (2013.01); *H04L 45/22* (2013.01); *H04L 45/24* (2013.01); *H04L 45/30* (2013.01); *H04L 45/80* (2022.05); *H04L 49/201* (2013.01)

(58) Field of Classification Search
CPC ....... H04L 49/101; H04L 45/22; H04L 45/24; H04L 45/30; H04L 45/80; H04L 49/201
See application file for complete search history.

(56) References Cited

U.S. PATENT DOCUMENTS

| | | | | |
|---|---|---|---|---|
| 10,735,325 | B1 * | 8/2020 | Singh | ...................... H04L 47/11 |
| 10,778,588 | B1 * | 9/2020 | Singh | ...................... H04L 12/18 |
| 2021/0409348 | A1 * | 12/2021 | Liu | ......................... H04L 49/25 |
| 2022/0217076 | A1 * | 7/2022 | Beecroft | ................. H04L 45/20 |
| 2023/0208748 | A1 * | 6/2023 | Goel | ................... H04L 43/0817 |
| | | | | 370/242 |

* cited by examiner

*Primary Examiner* — Donald L Mills
(74) *Attorney, Agent, or Firm* — Leydig, Voit & Mayer, Ltd.

(57) ABSTRACT

A method is provided for operating a network switch comprising a plurality of input ports and a plurality of output ports. The method comprises receiving a first data packet received via a first input port and a second data packet received via a second input port to be delivered to an egress endpoint connected to a first output port, configuring a plurality of crossbar switch units arranged in a tiled architecture to pass the first data packet to the first output port via a primary path and pass the second data packet to the first output port via a secondary path, and transmitting the first data packet and the second data packet to the egress endpoint. The first data packet and the second data packet pass through the plurality of crossbar switch units simultaneously.

20 Claims, 6 Drawing Sheets

CROSSBAR MULTIPATHING FOR MULTICAST PERFORMANCE IN TILED SWITCHES

CLAIM OF PRIORITY

This application claims the benefit of U.S. Provisional Application No. 63/213,901 titled "CROSSBAR MULTIPLEXING FOR MULTICASTING PERFORMANCE IN TILED SWITCHES," filed Jun. 23, 2021, the entire contents of which is incorporated herein by reference.

TECHNICAL FIELD

The present disclosure relates to a network device. More specifically, the embodiments set forth below describe a network device configured to perform parallel programming.

BACKGROUND

A data fabric is a concept that serves as an integrated layer (fabric) of data and connecting processes. As a key component in the data fabric, a network switch (e.g., a crossbar switch) takes traffic (e.g., data packets) in one port (e.g., from an ingress endpoint) and sends it out another port (e.g., to an egress endpoint). For example, a crossbar fabric can be implemented to connect multiple ingress and egress endpoints. The crossbar fabric can be a single crossbar switch with a large number of input/output ports, such as 100×100. Additionally and/or alternatively, the crossbar fabric can be formed by multiple crossbar switches, for instance, with a tiled crossbar architecture.

When distributing data in the data fabric, various operations may be performed. For example, a reduction operation may be applied to generate data to be distributed and followed by a network multicast operation. Sequencing a performant multicast in a network switch can be challenging, when the network switch is implemented using a tiled crossbar architecture. If all the multicast outputs are connected to different column tiles, the multicast can broadcast on the multi-drop row bus for a very efficient multicast. If all the outputs are connected to the same column tile the row bus broadcast technique cannot be used and the multicast must be serialized. There is a need for addressing these issues and/or other issues associated with the prior art.

SUMMARY

In an exemplary embodiment, the present disclosure provides a network device. The network device comprises a plurality of input ports configured to receive data packets from one or more ingress endpoints, a plurality of output ports configured to transmit data packets to one or more egress endpoints, a plurality of crossbar switching units arranged in a tiled configuration, and a plurality of multipath logic units. Each crossbar switching unit is connected to a number of row buses and a number of column buses. Each multipath logic unit comprises a first set of buffers, a second set of buffers, and a switching device. The first set of buffers in the multipath logic unit are connected to a first set of column buses corresponding to a first set of crossbar switching units in a first column of crossbar switching units in the tiled configuration. The second set of buffers in the multipath logic unit are connected to a second set of column buses corresponding to a second set of crossbar switching units in a second column of crossbar switching units in the tiled configuration. The first set of buffers correspond to a primary path between a particular input port and a particular output port of the network device. The second set of buffers correspond to an alternate path between the particular input port and the particular output port of the network device.

In a further exemplary embodiment, each multipath logic unit further comprises a first output and a second output. The first output corresponds to a first type of data packet and the second output corresponds to a second type of data packet.

In a further exemplary embodiment, each multipath logic unit is connected to a single output port of the network device.

In a further exemplary embodiment, each multipath logic unit is connected to two or more output ports of the network device.

In a further exemplary embodiment, the first column of crossbar switching units in the tiled configuration and the second column of crossbar switching units in the tiled configuration are neighboring columns.

In a further exemplary embodiment, the network device further comprises control logic configured to control at least one of the plurality of crossbar switching units and the plurality of multipath logic units.

In a further exemplary embodiment, the network device is configured to receive data packets from the one or more ingress endpoints connected to the plurality of input ports of the network device and transmit data packets to the one or more egress endpoints connected to the plurality output ports of the network device. Each input port and output port of the network device implements an Ethernet physical layer. The network device passes packets of variable lengths between the ingress endpoints and egress endpoints.

In a further exemplary embodiment, each multipath logic unit further comprises a third set of buffers. The third set of buffers are connected to a third set of column buses corresponding to a third set of crossbar switching units in a third column of the tiled configuration. The third set of buffers correspond to a tertiary path between the input port and the output port of the network device.

In a further exemplary embodiment, each multipath logic unit is configured to output a data packet from one of the buffers comprising the three sets of buffers to an egress endpoint that is connected to a corresponding output port of the multipath logic unit.

In a further exemplary embodiment, the network device further comprises a set of input buffers, each input buffer connected between a corresponding input port and a corresponding row bus included in the number of row buses.

In a further exemplary embodiment, the network device further comprises determining an order of one or more data packets among the data packets to take a same path between the primary path and the alternate path based on information included in the data packets.

In a further exemplary embodiment, the network device further determines whether to enable the alternate path based on a traffic class of the data packets.

In another exemplary embodiment, the present disclosure provides a method for operating a network switch comprising a plurality of input ports and a plurality of output ports. The method comprises receiving a first data packet received via a first input port and a second data packet received via a second input port to be delivered to an egress endpoint connected to a first output port, configuring a plurality of crossbar switch units arranged in a tiled architecture to pass the first data packet to the first output port via a primary path and pass the second data packet to the first output port via a secondary path, and transmitting the first data packet and the second data packet to the egress endpoint. The primary path corresponds with a first column of crossbar switch units arranged in the tiled configuration and the secondary path corresponds with a second column of crossbar switch units arranged in the tiled configuration. The first data packet and the second data packet pass through the plurality of crossbar switch units simultaneously.

In a further exemplary embodiment, the network switch further comprises a plurality of multipath logic units, each multipath logic unit comprising a first set of buffers, a second set of buffers, and a switching device. A first multipath logic unit of plurality of multipath logic units is associated with the first output port. A first buffer of the first set of buffers in the first multipath logic unit is connected to the first column of crossbar switch units corresponding to the primary path, a second buffer of the second set of buffers in the first multipath logic unit is connected to the second column of crossbar switch units corresponding to the secondary path, and a first output of the first multipath logic unit is connected to the first output port.

In a further exemplary embodiment, the switching network further comprises control logic configured to control at least one of the plurality of crossbar switching units and the plurality of multipath logic units.

In a further exemplary embodiment, the first multipath logic unit further comprises a second output connected to the first output port of the switching network. The first output corresponds to a first type of data packet and the second output corresponds to a second type of data packet.

In a further exemplary embodiment, the first multipath logic unit is further connected to a second output port of the network switch.

In a further exemplary embodiment, the method further comprises receiving a third data packet received via a third input port to be delivered to the egress endpoint connected to the first output port, configuring the plurality of crossbar switch units arranged in the tiled architecture to pass the third data packet to the first output port via the tertiary path, and transmitting, to the egress endpoint, the third data packet. The first data packet, the second data packet, and the third data packet pass through the plurality of crossbar switch units simultaneously.

In a further exemplary embodiment, the first multipath logic unit is configured to output a data packet from one of the buffers comprising the three sets of buffers to the egress endpoint that is connected to the first output of the first multipath logic unit.

BRIEF DESCRIPTION OF THE DRAWINGS

The present systems and methods for crossbar multipathing are described in detail below with reference to the attached drawing figures.

DETAILED DESCRIPTION

A technique for multipathing in network devices is disclosed. Network devices are designed with multipathing capabilities that enables multiple paths for passing data between endpoints. In particular, the network device is capable of utilizing alternative paths to pass data between endpoints so as to reduce network traffic.

In a network device, an output (e.g., from a column bus) may be paired with another output by routing the paired outputs to one output port. Therefore, the network device can pass data from two separate but paired outputs to reach the same output port. In this way, the network device can configure a primary path and an alternative path between an input port (e.g., an ingress endpoint) and an output port (e.g., an egress endpoint).

In some embodiments, when a first output is paired with a second output, the second output is connected to an additional path that is routed to a first output port connected to the first output. The path associated with the first output connected to the first output port is referred to as a primary path, while the path associated with the second output connected to first output port is referred to as an alternative path. In this way, two paths may be utilized to deliver data between a set of input port(s) and output port(s), in parallel, thus improving the network traffic as well as enabling multicast capabilities.

In some embodiments, a network device comprising a plurality of crossbar switches configured in a tiled architecture can be utilized to implement multipathing to improve multicast performance. The crossbar switches may be defined as tiles, which are arranged in a matrix configuration in the tiled architecture. The tiles of crossbar switches in the network device can be configured in pairs. A pair of tiles may receive data from the same input ports and deliver the data to the same output ports. In some examples, the pair of crossbar switches may be tiles disposed in a same row, which are connected to a same set of ingress endpoints. The crossbar switches may receive data from the ingress endpoints through the row buses. On the other hand, the pair of crossbar switches may be located in different columns and connected to two different sets of egress endpoints. The crossbar switches that are paired with other crossbar switches may output to two different sets of egress endpoints, a first set of egress endpoints through primary paths associated with the outputs and also a second set of egress endpoints through alternative (secondary) paths associated with the outputs of the paired crossbar switches. In particular, outputs of a pair of crossbar switches are routed to the same sets of egress endpoints through both the primary paths and secondary paths of the pair of crossbar switches. In this way, each set of endpoints that is connected to outputs of a crossbar switch can be reached through two different crossbar switches when taken inputs from the same ingress endpoints. By enabling alternative paths, the network device is granted with more flexibility in configuring parallel operations between ingress and egress endpoints, thus improving the network efficiency.

Figure 1A:
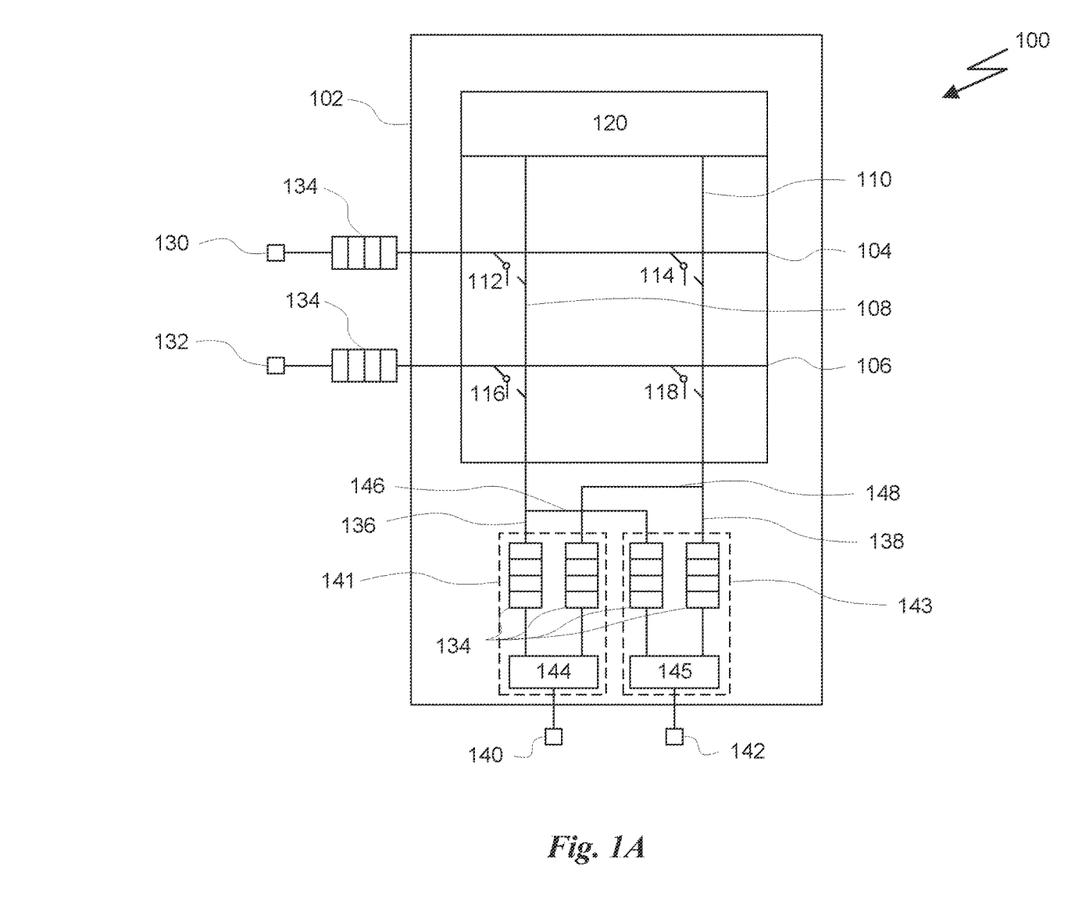
FIG. 1A illustrates an exemplary network including a plurality of endpoints connected to a network device, in accordance with some embodiments.

FIG. 1A illustrates an exemplary network 100 including a plurality of endpoints connected to a network device 102, in accordance with some embodiments. The network device 102 is referred to as a network switch in FIG. 1A. As a simplified example, the network device 102 includes two row buses, 104 and 106, and two column buses 108 and 110.

Input and output ports of the network device 102 are connected to the row and column buses, respectively. As shown in FIG. 1A, four endpoints 130, 132, 140, 142 are connected to the input/output ports of the network device 102. The row buses cross the column buses and form four crosspoints 112, 114, 116 and 118, which may include devices (e.g., diodes, logic gates, etc.), circuits or other mechanisms to change interconnection between row and column buses. Connectivity between row buses and column buses depends on the on/off state of the crosspoints. The network device 102 may include a control unit 120, such as an arbitrary logic unit, to control connectivity of the crosspoints. The endpoints 130 and 132 are connected to the row buses 104 and 106, respectively. The endpoints 140 and 142 are connected to column buses 108 and 110, respectively. The network device 102 is configured to enable any-to-any connectivity. In other words, an input from any of the endpoints connected to the row buses can be delivered to any of the endpoints connected to the column buses of the network device 102. In some instances, an input buffer 134 may be disposed between an endpoint (e.g., 130) and an input port of the network device 102. An output buffer 134 may be disposed between a column bus (e.g., 108) and a switching unit (e.g., a switch 144) that is connected to an output port of the network device 102. An input buffer 134 that is connected to an input port stores a sequence of data received from an endpoint, which is to be distributed by the network device 102. An output buffer 134 that is associated with an output port stores data passed by the network device 102, which is to be retrieved by an endpoint.

To illustrate, the endpoints 130 and 132 are connected to the input ports, and the endpoints 140 and 142 are connected to the output ports of the network device 102. To this end, the network device 102 includes two output ports, which are associated with column buses 108 and 110, respectively. In this embodiment, the two output ports are routed to be paired. At the output of the network device 102, a primary path 136 connects the output of the column bus 108 to the endpoint 140 through an output buffer 134 and a multipath logic unit 144. Further, the primary path 136 spins off an additional path 146, which is routed to the endpoint 142. An output buffer 134 stores data from the spin-off path 146 and waits for the endpoint 142 to retrieve the data. The output buffer 134 associated with the path 146 and a separate output buffer 134 associated with a primary path 138 are connected to a switch 145, which is configured to select data delivered by either the primary path 138 or the spin-off path 146 for the endpoint 142 to retrieve. The switch 145 may be a multiplexer, a crossbar switch or other types of switches to select data from multiple sources. The switch 145 may include an output port that is connected to the endpoint 142. The endpoint 142 may retrieve the data stored in the buffers 134 in series based on the interconnections of the switch 145. Likewise, the primary path 138 connects the output of the column bus 110 to the endpoint 142, and an additional path 148 may be spun off from the primary path 138. The additional path 148 is routed to the endpoint 140. An output buffer 134 stores data from the spin-off path 148 and is connected to a switch 144. Meanwhile, an output buffer 134 stores data from the primary path 136 and is also connected to the switch 144. The switch 144 may include an output port that is connected to the endpoint 140. The switch 144 is configured to select data delivered by either the primary path 136 or the spin-off path 148 for the endpoint 140 to retrieve. Similar to the switch 145, the switch 144 may be a multiplexer, a crossbar switch or other types of switches to select data from multiple sources. The endpoint 140 may retrieve the data stored in the buffers 134 in series based on the interconnections of the switch 144.

In some embodiments, the network device 102 includes one or more multipath logic units (MLUs) configured to select data packets received through the primary paths or secondary paths to output to one or more output ports of the network device 102. Each MLU includes a set of buffers (e.g., FIFOs) and a switching device. As shown in FIG. 1A, the network device 102 includes MLUs 141 and 143. As an example, the MLU 141 includes two output buffers 134 and the switch 144. One of the two output buffers 134 is connected to the column bus 108, which may be referred to as a primary path buffer for an output port coupled to the MLU 141. The other output buffer is connected to the column bus 110, which may be referred to as a secondary path buffer for the output port coupled to the MLU 141. The primary path and secondary path buffers in the MLU 141 are connected to the switch 144, which selects outputs for the MLU 141.

As illustrated in an exemplary operation, when the network device 102 receives a data packet from the endpoint 130 and is instructed to deliver the data packet to the endpoint 140, the network device 102 may set up one of the two paths to pass the data packet. For instance, the network device 102 may set the crosspoint 112 to on-state, and pass a data packet received from the row bus 104 to the column bus 108. As a result, the data packet may be delivered to the endpoint 140 through the primary path 136. In some variations, to avoid contention in the primary path 136, the network device 102 may set the crosspoint 114 to on-state, and pass a data packet received from the row bus 104 to the column bus 110. As a result, the data packet may be delivered to the endpoint 140 through the spin-off path 148. As such, the data packet may be delivered to one of the output buffers 134 that are connected to the switch 144. By setting the switch 144 to select the output buffer 134 that stores the data packet, the endpoint 140 can retrieve the data packet from the endpoint 130.

As another example, when the network device 102 receives a data packet from the endpoint 130 and a data packet from the endpoint 132 and is instructed to deliver both of the data packets to the endpoint 140, the network device 102 may enable an alternative path to deliver the two data packets in parallel. For instance, the network device 102 may set the crosspoint 112 to on-state, such that the data packet received from the endpoint 130 is passed to the endpoint 140 through the primary path 136. On the other hand, the network device 102 may set the crosspoint 118 to on-state, such that the data packet received from the endpoint 132 is passed to the endpoint 140 through the alternative path 148. The data packets can be loaded to separate output buffers 134 that are connected to the switch 144 concurrently. Subsequently, the switch 144 may select one of the output buffers 134 at a time to connect to the endpoint 140, such that the endpoint 140 may retrieve the data packets stored in the output buffers 134 in series. It will be appreciated that even though the data packets are still delivered to the endpoint 140 in series, passing the data packets to the output buffers 134 in parallel can improve network efficiency by freeing up the crossbar fabric to route other data packets to other output ports in a subsequent cycle in parallel with delivering the second of two data packets to the endpoint 140.

In some variations, the MLU 141 or 143 as shown in FIG. 1A may include two or more output ports. For instance, the two or more output ports may correspond to different types of data packets, such as regular data packets, reduction data packets, and other types of data packets. For another instance, the MLUs 141 and 143 may be combined into a single multipath logic unit, which may include a 2×2 multiplexer to replace the switch 144/145. To this end, the 2×2 multiplexer may be connected to two output buffers 134 on one side, and connected to two endpoints 140 and 142 on the other side. In this way, two output buffers 134 may be saved comparing to the configuration as shown in FIG. 1A.

It will be appreciated that FIG. 1A demonstrates a simplified network device for ease of demonstrating the multipathing techniques. In some variations, a network device may include a single network switch with a large number of row and column buses, such as 100×100. As such, the network device may be utilized to perform switching processes between a large number of endpoints connected to the network switch. Similar to the aforementioned techniques, the output ports of the network device can be paired to provide for alternative paths thus enabling multipathing to reduce network traffic.

Figure 1B:
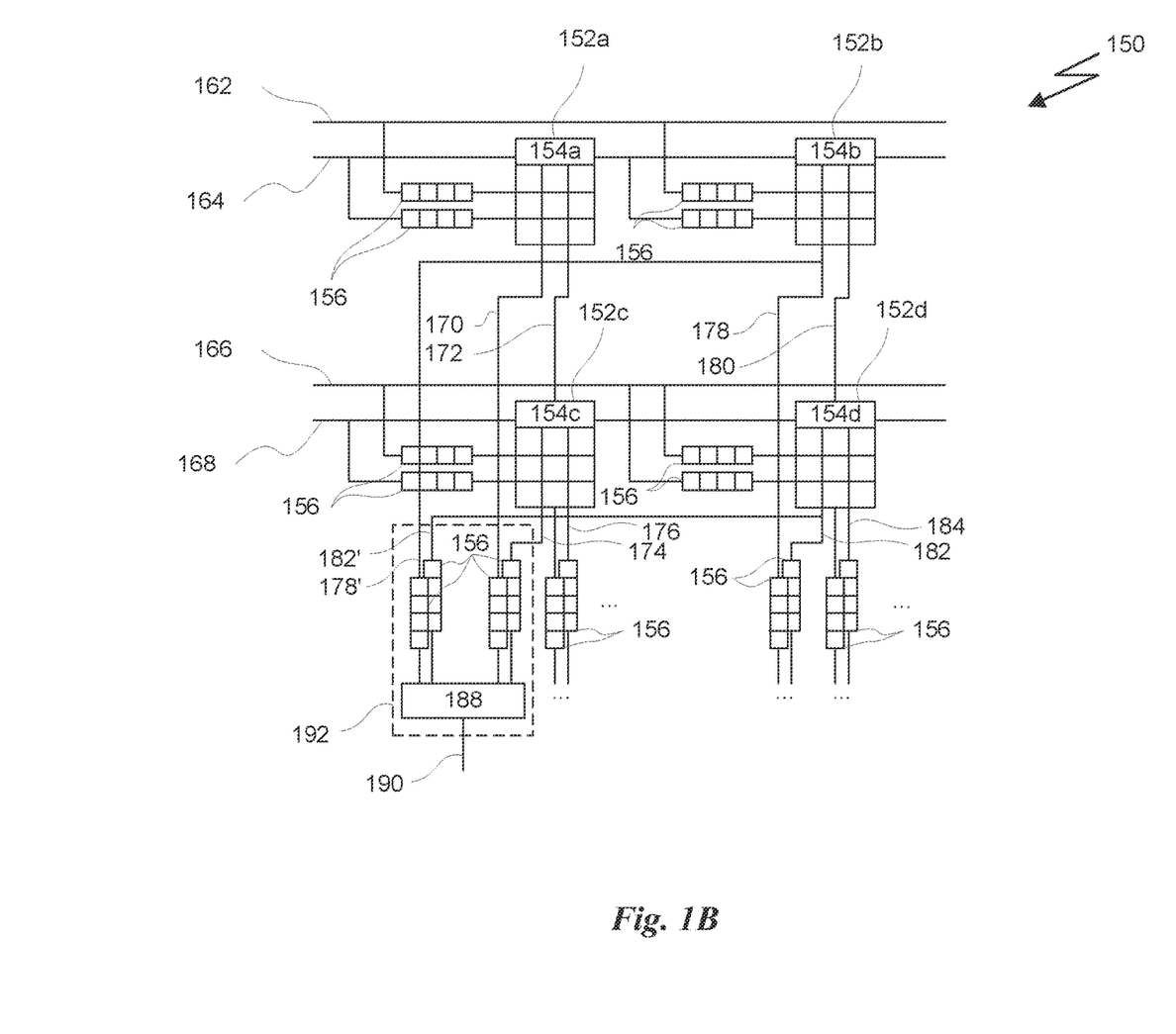
FIG. 1B illustrates an exemplary network including a network device having a tiled crossbar architecture, in accordance with some embodiments.

FIG. 1B illustrates an exemplary network device 150 with a tiled crossbar architecture, in accordance with some embodiments. As depicted in FIG. 1B, the network device 150 includes four crossbar switches 152a, 152b, 152c and 152d in a matrix configuration. Each crossbar switch 152 is referred to as a tile. A crossbar switch may have a similar structure as depicted in FIG. 1A. Alternatively, a crossbar switch may form other types of interconnection networks, such as mesh or butterfly interconnections. Each of the crossbar switches 152 may include a control unit (e.g., a control unit 154a in the crossbar switch 152a), which selects paths for passing data from an input port to an output port for the respective tile. As a simplified example, each tile has 2×2 input/output ports.

As illustrated in FIG. 1B, the crossbar switches 152 are connected to four row buses, 162, 164, 166 and 168. The crossbar switches 152a and 152b are arranged in a first row, which are connected to the row buses 162 and 164. The crossbar switches 152c and 152d are arranged in a second row, which are connected to the row buses 166 and 168. Each of the crossbar switches 152 is connected to two column buses. For instance, the crossbar switch 152a is connected to column buses 170 and 172, and the crossbar switch 152c is connected to column buses 174 and 176. As shown in FIG. 1B, the crossbars switches 152a and 152c are arranged in a first column. The column buses 170 and 174 are connected to a switch 188, and the column buses 172 and 176 are connected to a separate switch (not explicitly shown in FIG. 1B). As a result, an endpoint connected to the switch may select outputs that are passed from different row inputs to the same column outputs. Similarly, the crossbar switch 152b is connected to column buses 178 and 180, and the crossbar switch 152d is connected to column buses 182 and 184. As shown in FIG. 1B, the crossbars switches 152b and 152d are arranged in a second column. Although not depicted in FIG. 1B, the column buses 178 and 182 are connected to a switch 188, and the column buses 180 and 184 are connected to a separate switch 188. In some variations, buffers 156 may be connected to the input/output ports of the crossbar switches 152 to store data.

As an example, the crossbar switches 152 in the first column is paired with the crossbar switches 152 in the second column as shown in FIG. 1B. In particular, the crossbar switch 152a is paired with the crossbar switch 152b, while the crossbar switch 152c is paired with the crossbar switch 152d. Further, the column bus 170 and a spin-off path 178' from the column bus 178 are connected to one switch 188. Similarly, the column bus 174 and a spin-off path 182' from the column bus 182 are connected to one switch 188. In some instances, the column buses 170 and 174 are connected to a same switch 188. As a result, the switch 188 can be connected to the column buses 170 and 174 and the spin-off paths 178' and 182'. An endpoint that is connected to the port 190 can retrieve data from four separate buffers 156, which store data from two tiles in the first column and two tiles from the second column that is paired with the first column. Although not depicted in FIG. 1B, the column buses 172 and 176 and the spin-off paths from the column buses 180 and 184 are connected to a separate switch 188. Likewise, the column buses 178 and 182 and the spin-off paths from the column buses 170 and 174 are connected to a separate switch 188, while the column buses 180 and 184 and the spin-off paths from the column buses 172 and 176 are connected to a separate switch 188.

In an embodiment, the network device 150 includes one or more MLUs configured to select data packets received through the primary paths or secondary paths to output to one or more output ports of the network device 150. Each MLU includes a set of buffers (e.g., FIFOs) and a switching device. A first portion (i.e., subset) of the buffers in the MLU are connected to column buses connected to a first column of crossbar switching units in the tiled architecture of the fabric. A second portion (i.e., subset) of the buffers in the MLU are connected to column buses connected to a second column of crossbar switching units in the tiled architecture of the fabric. The first subset of the buffers may be referred to as primary path buffers for the one or more output ports coupled to the MLU, and the second subset of the buffers may be referred to as secondary path buffers for the one or more output ports coupled to the MLU. As shown in FIG. 1B, the network device 150 includes an exemplary MLU 192, which includes a set of four buffers 156 and a switch 188. A subset of two buffers 156 are connected to column buses connected to the first column of crossbar switches, which may be referred to as primary path buffers. Another subset of two buffers 156 are connected to column buses connected to the second column of crossbar switches, which may be referred to as secondary path buffers. The primary and secondary buffers 156 are connected to the switch 188, which selects outputs for the MLU 192.

As illustrated in an exemplary operation, when the network device 150 is instructed to receive a data packet from the row bus 162 and deliver the data packet to an endpoint connected to the port 190, the network device 150 may set up one of the two paths to pass the data packet. For instance, the network device 150 may pass the data packet to the crossbar switch 152a via the row bus 162. The data packet may be passed to the column bus 170 and finally delivered to the port 190. In some variations, to avoid contention in the primary path 170, the network device 150 may pass a data packet to the crossbar switch 152b via the row bus 162. The data packet may be passed to the spin-off path 178' and finally delivered to the port 190. The data packet may be stored in one of the buffers 156 connected to the switch 188. The network device 150 may transmit the data packet to an endpoint that is connected to the port 190 by configuring the interconnections of the switch 188.

As another example, when the network device 150 is instructed to receive two data packets from the row buses 162 and 164, then deliver these data packets to an endpoint connected to the port 190, the network device 150 may set up two paths in parallel to deliver the data packets. On one hand, the network device 150 may pass one data packet to the crossbar switch 152a via the row bus 162. The data packet may be passed to the column bus 170 and finally delivered to the port 190. On the other hand, the network device 150 may pass the other data packet to the crossbar switch 152*b* via the row bus 164. The data packet may be passed to the spin-off path 178' and finally delivered to the port 190. The data packets can be loaded to separate buffers 156 that are connected to the switch 188 concurrently. Subsequently, the switch 188 may select one of the buffers 156 at a time to connect to the port 190, such that the port 190 may output the data packets stored in the buffers 156 in series.

However, it will be appreciated that FIG. 1B demonstrates a simplified network switch for ease of disclosing the multipathing techniques. The number of tiles included in the network switch as well as the number of input/output ports included in each tile are not limited in the present disclosure. Moreover, pairing of two tiles are not limited to two tiles in the neighboring columns. Any two separate tiles in the network switch can be paired. In some further examples, more than two separate tiles can be grouped such that two or more alternative paths may be configured to supplement the primary path for delivering data packets between one set of input and output ports.

In some variations, each input port and output port of the exemplary network device, such as the network device 100/150, implement an Ethernet physical layer. The data packets may have variable lengths and/or adopt various formats. For instance, the data packets may be Ethernet packets, NVlink packets, or packets of other formats.

Figure 2A:
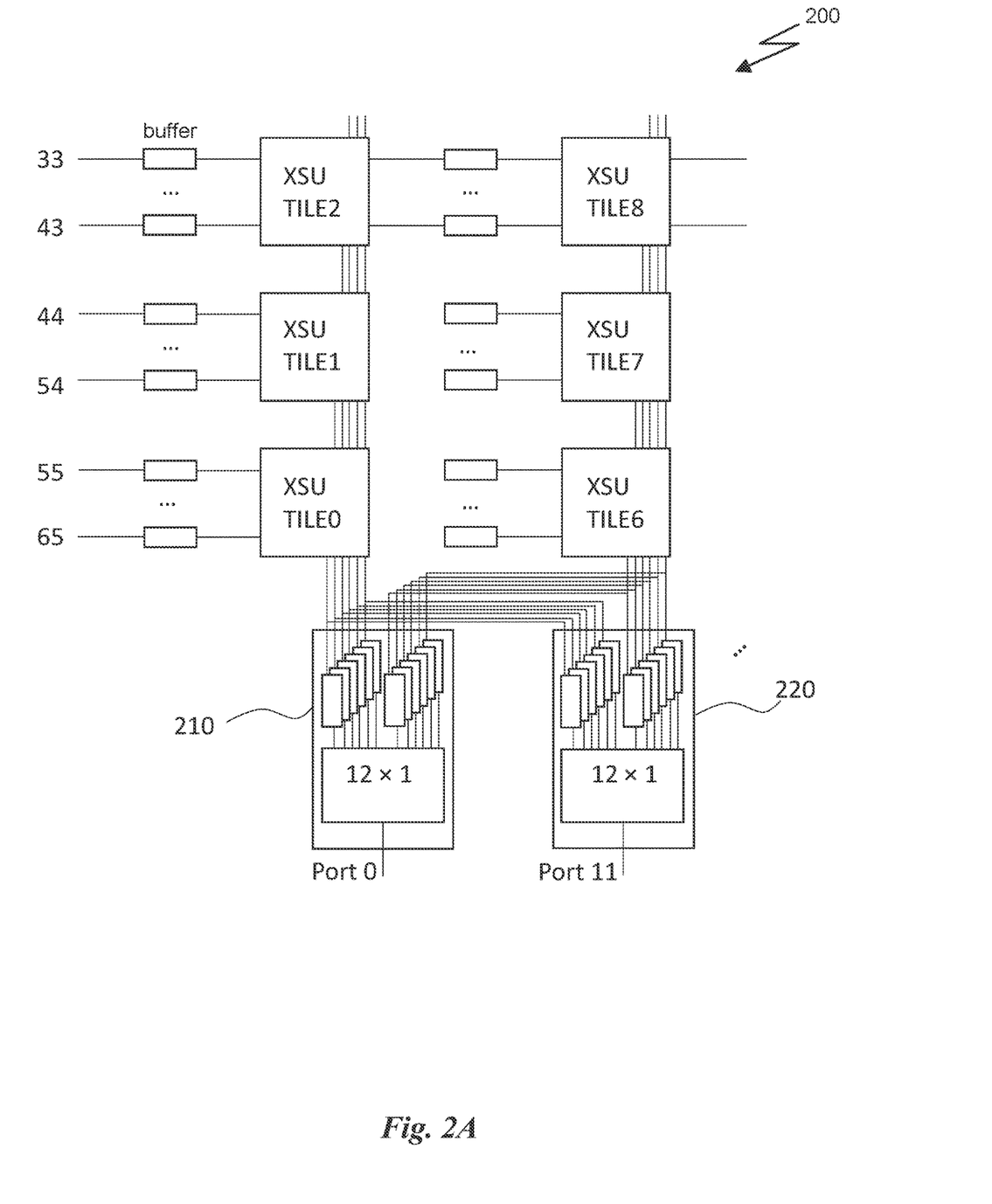
FIG. 2A illustrates an exemplary network implemented with the multipathing techniques disclosed herein, in accordance with some embodiments.
Figure 2B:
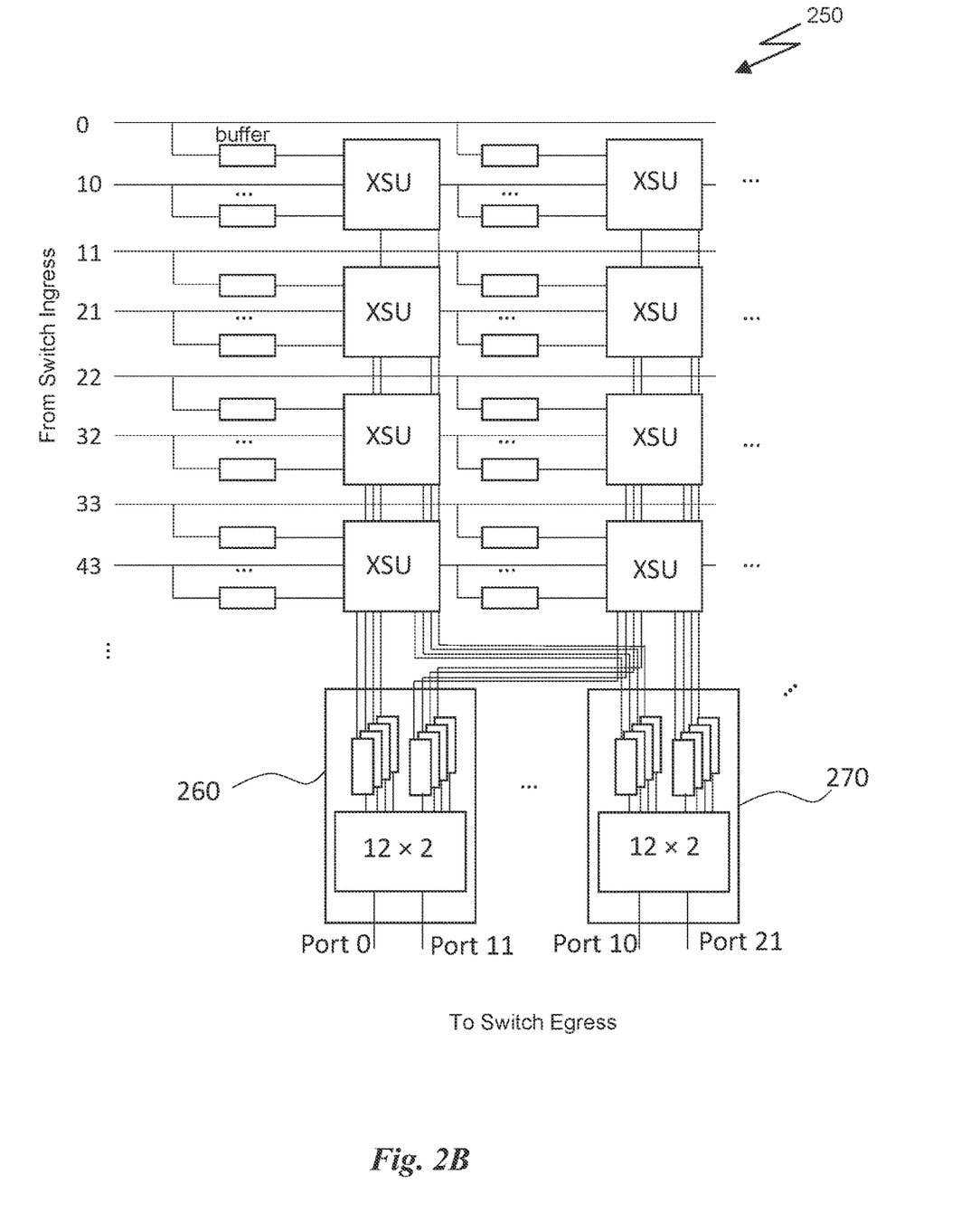
FIG. 2B illustrates an exemplary network implemented with the multipathing techniques disclosed herein, in accordance with some embodiments.

FIGS. 2A and 2B demonstrates two exemplary network devices implemented with the aforementioned multipathing techniques in accordance with some embodiments.

As illustrated in FIG. 2A, a network device 200 includes a plurality of crossbar switch units (XSUs) in a tiled architecture. Each XSU is referred to as a tile in the network device 200. There are at least 12 tiles in the network device, however, only six tiles are presented in FIG. 2A for ease of demonstration. The interconnections between the tiles are similar to the layout depicted in FIG. 1B. Each tile of XSU has 11 rows and 11 columns. Each XSU is connected to a set of row inputs. For example, TILE0 is connected to rows 55-65. The 12 tiles of XSUs are arranged in six rows and two columns (only three rows and two columns are depicted in FIG. 2A). Each column of XSUs are connected to one set of ports. For example, the XSUs in the left column as shown in FIG. 2A are connected to ports 0-10, which correspond to the 11 outputs of each XSU. In this embodiment, the XSUs in one column are paired with the respective XSUs in the other column. For instance, the outputs of the XSUs in one column are routed to the port corresponding to the column and also to a separate port corresponding to the pairing column. As a result, port 0 may receive data from 6×2 output ports. Among these output ports, six outputs are from the XSUs in the left column, and six outputs are from the XSUs in the right column.

In an embodiment, the network device 200 includes one or more MLUs (e.g., 210 or 220) configured to select data packets received through the primary paths or secondary paths to output to one or more output ports of the network device. Each MLU includes a set of buffers (e.g., FIFOs) and a switching device. A first portion (i.e., subset) of the buffers in the MLU are connected to column buses connected to a first column of crossbar switching units in the tiled architecture of the fabric. A second portion (i.e., subset) of the buffers in the MLU are connected to column buses connected to a second column of crossbar switching units in the tiled architecture of the fabric. The first subset of the buffers may be referred to as primary path buffers for the one or more output ports coupled to the MLU, and the second subset of the buffers may be referred to as secondary path buffers for the one or more output ports coupled to the MLU.

To illustrate an exemplary operation, when the network device 200 is enabled to utilize alternative paths, a data packet can be passed from the row 55 to the port 0 through two different paths. One path is set to pass through TILE0 and connected to an output buffer, whereas the other path is set to pass through TILE6 and connected to a separate output buffer. The output buffers associated with the two paths are connected to a 12×1 switch, which allows the connected endpoint to retrieve data from 12 possible output ports from the XSUs. The 12×1 switch may be a multiplexer, a crossbar switch or other types of switches to select data from multiple sources. In some instances, the switch may include two outputs, which may be configured to output different types of data packets, such as regular data or data processed by a reduction operation. It will be appreciated that other types and/or number of data outputs may be implemented in practical usage.

As another example, when the network device 200 is configured to pass a first data packet from the row 55 to the port 0 and a second data packet from the row 65 to the port 0, the network device 200 may pass these two data packets in parallel by utilizing an alternative path. For instance, the first data packet may be passed through TILE0. Meanwhile, the second data packet may be passed through TILE6. The first and second data packets can be loaded to separate buffers that are connected to the 12×1 switch concurrently. Then the 12×1 switch may select one of the buffers at a time to connect to the port 0, such that the port 0 may output the data packets stored in the buffers in series.

In some instances, the network device 200 may comprise one or more controller or control logic to control the XSUs, multipath logic units, and/or buffers comprised in the network device 200. For instance, a controller or control logic may configure an alternative path to pass a data packet, configure multiple paths to pass multiple data packets in parallel, and/or configure the multipath logic units to output data stored in the output buffers.

FIG. 2B illustrates another exemplary network device 250. The network device 250 includes a plurality of tiles of XSUs arranged in more than four columns, and each column corresponds with six rows of XSUs. The interconnections between the XSUs in the network device 250 may be similar to FIG. 2A. In this embodiment, each odd column of tiles are paired with an adjacent even column of tiles. Different from the configuration in FIG. 2A, the paired outputs from two tile columns are integrated into a single 12×2 switch. For example, ports 0 and 11 to switch egress can be read from a single 12×2 switch.

In an embodiment, the network device 250 includes one or more MLUs (e.g., 260 or 270) configured to select data packets received through the primary paths or secondary paths to output to one or more output ports of the network device. Each MLU includes a set of buffers (e.g., FIFOs) and a switching device. A first portion (i.e., subset) of the buffers in the MLU are connected to column buses connected to a first column of crossbar switching units in the tiled architecture of the fabric. A second portion (i.e., subset) of the buffers in the MLU are connected to column buses connected to a second column of crossbar switching units in the tiled architecture of the fabric. The first subset of the buffers may be referred to as primary path buffers for the one or more output ports coupled to the MLU, and the second subset of the buffers may be referred to as secondary path buffers for the one or more output ports coupled to the MLU.

To illustrate an exemplary operation, when the network device 250 is enabled to utilize alternative paths, a data packet that is received at port 0 from switch ingress can be passed to port 10 to the switch egress through two different paths. One path is set to pass through the tile disposed at the first row from the top and the first column from the left, whereas the other path is set to pass through the tile disposed at the first row from the top and the second column from the left. These two paths are connected to separate output buffers, which are connected to a single 12×2 switch, which allows a connected endpoint to receive data from 12 possible output ports from the XSUs. The 12×2 switch may be a multiplexer, a crossbar switch or other types of switches to select data from multiple sources. In some examples, the switch may include four outputs, which may be configured to output two different types of data packets, such as regular data or data processed by a reduction operation. It will be appreciated that other types and/or number of data outputs may be implemented in practical usage.

As another example, when the network device 250 is configured to pass a first data packet from the port 0 at the switch ingress to the port 10 at the switch egress and a second data packet from the port 10 at the switch ingress to the port 10 at the switch egress, the network device 250 may pass these two data packets in parallel by utilizing an alternative path. For instance, the first data packet may be passed through the tile disposed at the first row from the top and the first column from the left. Meanwhile, the second data packet may be passed through the tile disposed at the first row from the top and the second column from the left. The first and second data packets can be loaded to separate buffers that are connected to the 12×2 switch concurrently. Then the 12×2 switch may connect one of the buffers at a time to the port 10 at the switch egress, such that the port 10 may output the data packets stored in the buffers in series.

In some instances, the network device 250 may comprise one or more controller or control logic to control the XSUs, multipath logic units, and/or buffers comprised in the network device 250. For instance, a controller or control logic may configure an alternative path to pass a data packet, configure multiple paths to pass multiple data packets in parallel, and/or configure the multipath logic units to output data stored in the output buffers.

Figure 3:
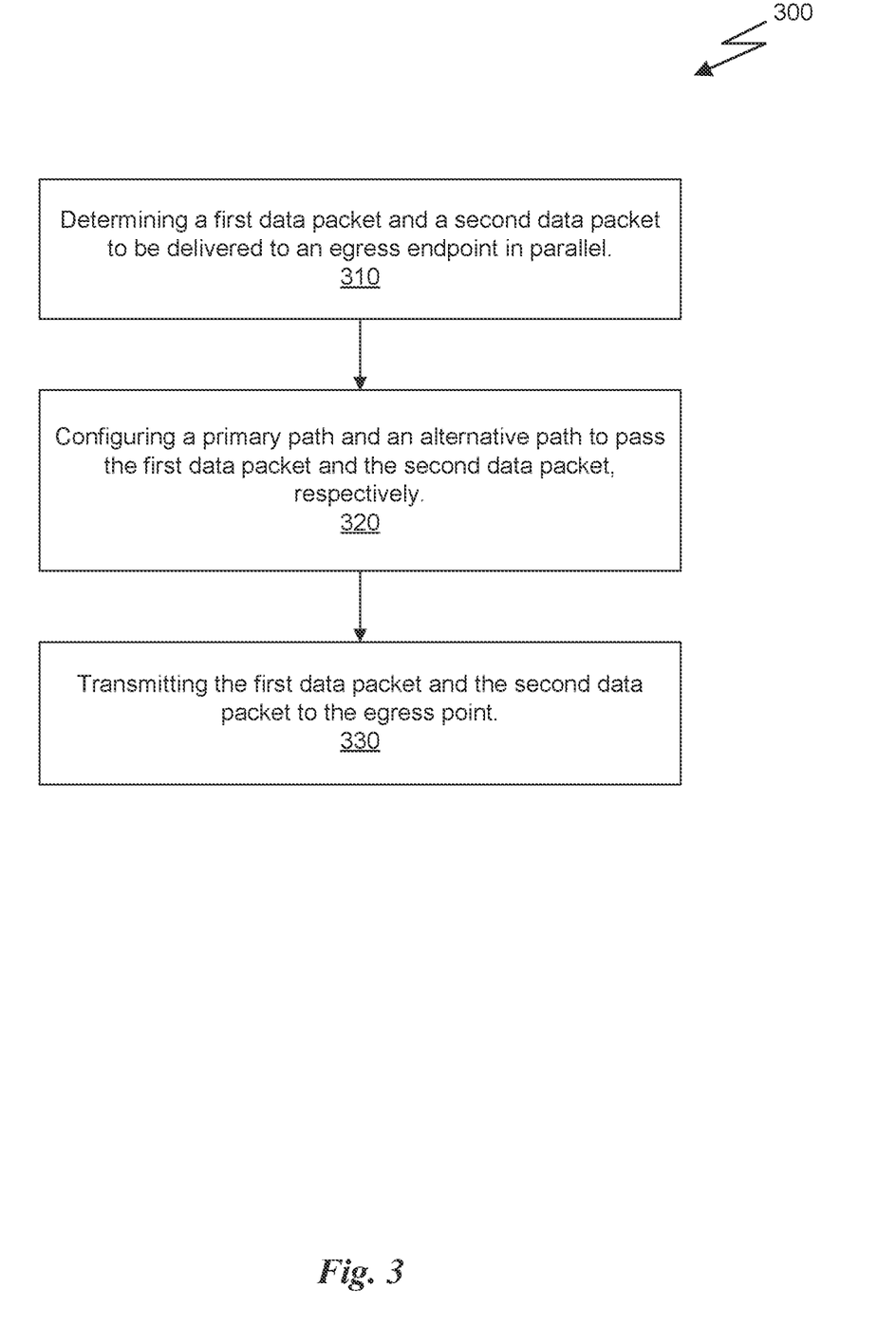
FIG. 3 illustrates an exemplary process for multipathing, in accordance with some embodiments.

FIG. 3 illustrates an exemplary process 300 for multipathing by utilizing the techniques disclosed herein, in accordance with some embodiments. A network device comprises a switching network similar to the ones as shown in FIGS. 1A, 1B, 2A and 2B, and the network device may be utilized to perform the process 300. The network device may further include and/or be connected to one or more control units, so as to control the delivery paths of data between input/output ports of the network device. The input ports of the network device are connected to ingress endpoints, and the output ports of the network device are connected to egress endpoints.

At block 310, the network device determines a first data packet and a second data packet to be delivered to an egress endpoint. As the foregoing illustrates, the first data packet and the second data packet may be received from different ingress endpoints. The output port of the network device, which is connected to the egress endpoint, may be connected to separate sets of output buffers through a multipath logic unit. One set of output buffers may be associated with a primary path, and another set of output buffers may be associated with an alternative path. Without enabling an alternative path, the network device may detect a conflict of passing the first data packet and the second data packet through their respective primary paths simultaneously.

At block 320, the network device configures a primary path and an alternative path to pass the first data packet and the second data packet, respectively. For instance, the network device may configure a plurality of crossbar switch units arranged in a tiled architecture to pass the first data packet to an output port via a primary path and pass the second data packet to the same output port via a secondary path. The primary path corresponds with a first column of crossbar switch units arranged in the tiled configuration, and the secondary path corresponds with a second column of crossbar switch units arranged in the tiled configuration. The first data packet and the second data packet pass through the plurality of crossbar switch units simultaneously.

At block 330, the network device transmits the first data packet and the second data packet to the egress endpoint. In some examples, the network device includes one or more MLUs configured to select data packets received through the primary paths or secondary paths to output to one or more output ports of the network device. For instance, the above-mentioned primary path and the corresponding alternative path are connected to one side of a multipath logic unit. The other side of the multipath logic unit is connected to an egress endpoint. The first data packet and the second data packet are loaded in separate output buffers, which are included in the multipath logic unit. The switch included in the multipath logic unit may be configured to connect one of the output buffers to the egress endpoint at a time, such that the egress endpoint may retrieve the data packets stored in the output buffers in series while the crossbar fabric is routing data from one or more other ingress endpoints to one or more other egress endpoints.

In some variations, the network device may be configured to enable a primary path and two or more alternative paths between one set of ingress endpoints and an egress endpoint. As an example, three of the tile columns as shown in FIG. 2B may be grouped in a way that the outputs of the grouped tiles can be routed to a same multipath logic unit that is connected to an egress endpoint. In such a configuration, the network device may set two alternative paths that can operate in parallel with the primary path to deliver data from three different ingress endpoints to the egress endpoint.

In an embodiment, one or more packet ordering constraints may be maintained for applying the multipathing technique disclosed herein. For instance, a network device comprises a switching network similar to the ones as shown in FIGS. 1A, 1B, 2A and 2B, may use information included in packets to ensure that the packets stay ordered to take the same path through the multipath-enabled switching network.

In a further embodiment, the network device in the present disclosure may be configured to support different multipathing properties for different traffic classes. For example, the network device may enable/disable the multipath capabilities based on the determination of a traffic class. Data packets in network traffic may be classified into a number of traffic classes, according to various parameters, for example, port number or protocol. Typical traffic classes include sensitive traffic, best-effort traffic, and undesired traffic, with decreasing priority. It should be noted that network traffic may be classified into other traffic classes.

Figure 4:
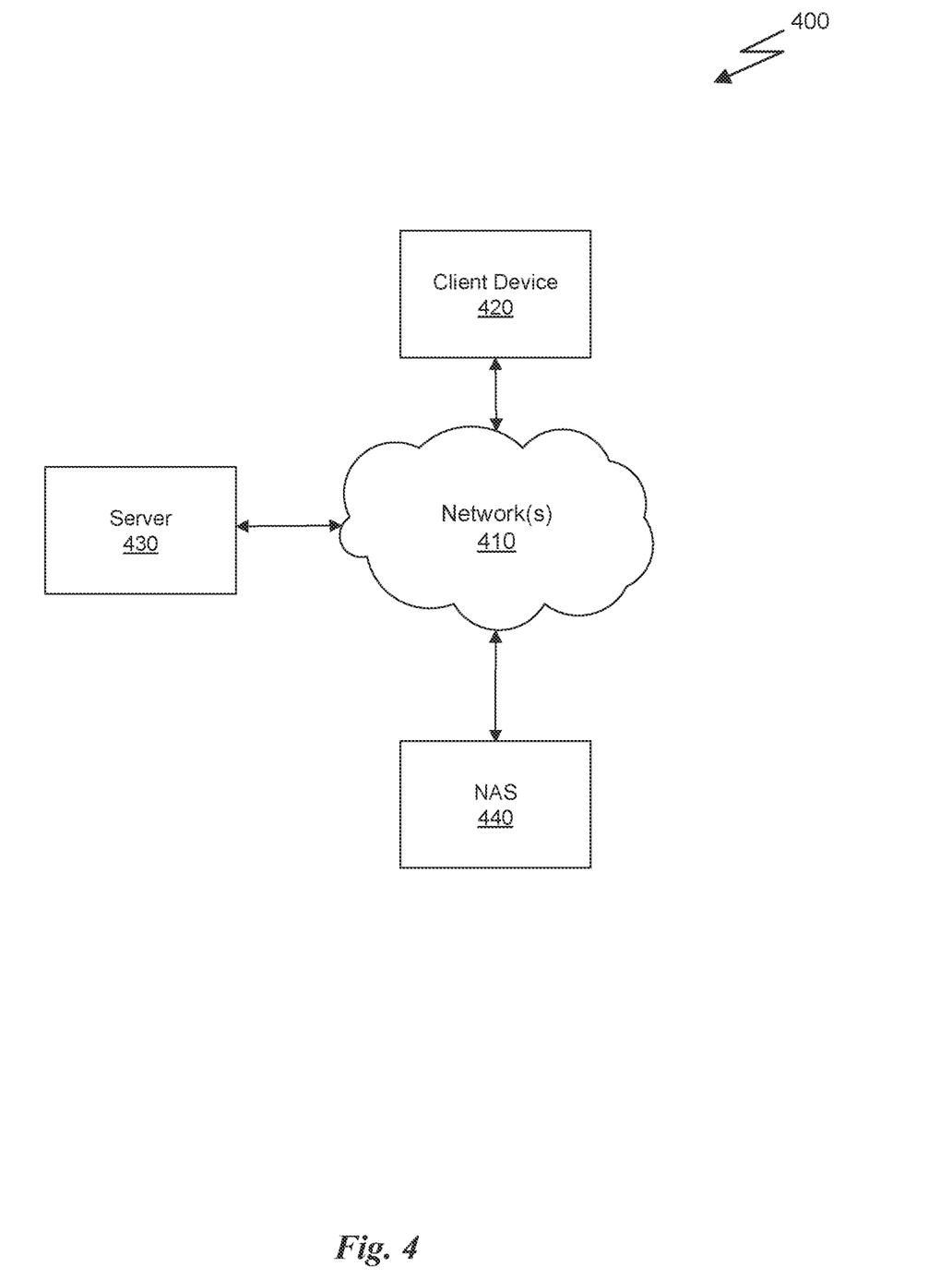
FIG. 4 illustrates an exemplary network environment in implementing some embodiments of the present disclosure.

FIG. 4 illustrates an exemplary network environment 400, in accordance with some embodiments. Network environments suitable for use in implementing embodiments of the disclosure may include one or more client devices 420, servers 430, network attached storage (NAS) 440, other backend devices, and/or other device types.

Components of a network environment may communicate with each other via a network(s) 410, which may be wired, wireless, or both. The network 410 may include multiple networks, or a network of networks. By way of example, the network 410 may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity. The network 410 may include switching devices, which may be implemented as one or more instances of exemplary network 100 of FIG. 1A, exemplary network device 150 of FIG. 1B, exemplary network device 200 of FIG. 2A and/or exemplary network device 250 of FIG. 2B. Additionally and/or alternatively, the network 410 may be configured to pass data between the components of the network environment 400 by implementing the exemplary process 300 of FIG. 3.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B")

is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A network device, comprising:
    a plurality of input ports configured to receive data packets from one or more ingress endpoints;
    a plurality of output ports configured to transmit data packets to one or more egress endpoints;
    a plurality of crossbar tile switches arranged in a plurality of rows and a plurality of columns, each crossbar tile switch connected to a number of row buses and a number of column buses; and
    a plurality of multipath logic units (MLUs), each MLU comprising a first set of buffers, a second set of buffers, and a switching device;
    wherein the first set of buffers in each MLU are connected to column buses of a first column of crossbar tile switches, and the second set of buffers in each MLU are connected to column buses of a second column of crossbar tile switches, and
    wherein the first set of buffers in each MLU are included in primary paths between input ports and output ports and the second set of buffers in each MLU are included in alternate paths between input ports and output ports, each respective pair of a respective input port and a respective output port being connected by both a primary path and an alternate path.

2. The network device of claim 1, wherein each MLU further comprises a first output corresponding to a first type of data packet and a second output corresponding to a second type of data packet.

3. The network device of claim 1, wherein each MLU is connected to a single output port of the plurality of output ports.

4. The network device of claim 1, wherein each MLU is connected to two or more output ports of the plurality of output ports.

5. The network device of claim 1, wherein the first column of crossbar tile switches and the second column of crossbar tile switches are neighboring columns.

6. The network device of claim 1, further comprising:
    control logic configured to control at least one of the plurality of crossbar tile switches and the plurality of MLUs.

7. The network device of claim 1, wherein the network device is configured to receive data packets from the one or more ingress endpoints connected to the plurality of input ports and transmit data packets to the one or more egress endpoints connected to the plurality of output ports, wherein each input port and each output port of the network device implements an Ethernet physical layer, and wherein the network device passes packets of variable lengths between the ingress endpoints and egress endpoints.

8. The network device of claim 1, wherein each MLU further comprises a third set of buffers connected to a third set of column buses corresponding to a third set of crossbar tile switches in a third column, and wherein the third set of buffers correspond to a tertiary path between the input port and the output port of the network device.

9. The network device of claim 8, wherein each MLU is configured to output a data packet from one of the buffers of the third set of buffers to an egress endpoint that is connected to a corresponding output port of the MLU.

10. The network device of claim 1, further comprising a set of input buffers, each input buffer connected between a corresponding input port and a corresponding row bus.

11. The network device of claim 6, wherein the control logic is configured to determine, based on information included in the data packets, an order of one or more data packets to take a same path between the primary path and the alternate path provided by a respective crossbar tile switch and a respective MLU.

12. The network device of claim 6, wherein the control logic is further configured to determine whether to enable, for a respective crossbar tile switch and a respective MLU, the alternate path based on a traffic class of the data packets.

13. A method for operating a network switch comprising a plurality of input ports and a plurality of output ports, the method comprising:
    receiving, via a first input port, a first data packet to be delivered to an egress endpoint connected to a first output port;
    receiving, via a second input port, a second data packet to be delivered to the egress endpoint connected to the first output port;
    configuring a plurality of crossbar tile switches, arranged in a plurality of rows and a plurality of columns, to pass the first data packet to the first output port via a primary path and to pass the second data packet to the first output port via a secondary path, wherein the primary path includes a first column of crossbar tile switches and the secondary path includes a second column of crossbar tile switches; and
    transmitting, to the egress endpoint, the first data packet via the primary path and the second data packet via the secondary path, wherein the first data packet and the second data packet pass through the plurality of crossbar tile switches simultaneously.

14. The method of claim 13, wherein the network switch further comprises a plurality of multipath logic units (MLUs), each MLU comprising a first set of buffers, a second set of buffers, and a switching device,
    wherein a first MLU is connected to the first output port via a first MLU output, and
    wherein a first buffer of the first set of buffers of the first MLU is connected to the first column of crossbar tile switches, and
    wherein a second buffer of the second set of buffers in the first MLU is connected to the second column of crossbar tile switches.

15. The method of claim 14, wherein the network switch further comprises control logic configured to control at least one of the plurality of crossbar tile switches and the plurality of MLUs.

16. The method of claim 14, wherein the first MLU is connected to the first output port via a second MLU output, and wherein the first output corresponds to a first type of data packet and the second output corresponds to a second type of data packet.

17. The method of claim 14, wherein the first MLU is further connected to a second output port.

18. The method of claim 14, wherein the first MLU further comprises a third set of buffers, a third buffer of the third set of buffers of the first MLU is connected to a third column of crossbar tile switches, and the third column of crossbar tile switches is included in a tertiary path to the first output port-of the switching network.

19. The method of claim 18, the method further comprising:
  receiving, via a third input port, a third data packet to be delivered to the egress endpoint connected to the first output port;
  configuring the plurality of crossbar tile switches to pass the third data packet to the first output port via the tertiary path; and
  transmitting, to the egress endpoint, the third data packet, wherein the first data packet, the second data packet, and the third data packet pass through the plurality of crossbar tile switches simultaneously.

20. The method of claim 19, wherein the first MLU is configured to output a data packet from one of the buffers of the three sets of buffers to the egress endpoint that is connected to the first output of the first MLU.

* * * * *